(12) United States Patent
Miura

(10) Patent No.: US 6,463,023 B1
(45) Date of Patent: Oct. 8, 2002

(54) OPTICAL HEAD AND METHOD FOR MONITORING LIGHT SOURCE OUTPUT IN OPTICAL HEAD

(75) Inventor: Masafumi Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/309,762

(22) Filed: May 11, 1999

(30) Foreign Application Priority Data

May 11, 1998 (JP) .......................................... 10-127257

(51) Int. Cl.[7] .............................................. G11B 7/135
(52) U.S. Cl. .............................. 369/53.26; 369/112.06; 369/112.1; 369/112.18; 369/112.19; 369/118
(58) Field of Search ............. 369/53.26, 112.18–112.19, 369/118, 116, 112.06, 112.1

(56) References Cited

U.S. PATENT DOCUMENTS

| | | |
|---|---|---|
| 4,989,198 A | 1/1991 | Kojima et al. |
| 5,168,491 A | 12/1992 | Akatsuka et al. |
| 5,189,655 A * | 2/1993 | Ogata et al. ............... 369/54 X |
| 5,515,350 A * | 5/1996 | Katayama .................. 369/54 |
| 5,600,621 A * | 2/1997 | Noda et al. ................. 369/116 |
| 5,793,736 A * | 8/1998 | Ishimaru et sl. ............ 369/116 |
| 6,134,210 A * | 10/2000 | Masakado et al. .......... 369/116 |

FOREIGN PATENT DOCUMENTS

| | | |
|---|---|---|
| JP | 4-330646 | 11/1992 |
| JP | 6-309685 | 11/1994 |
| JP | 7-169063 | 7/1995 |
| JP | 7-272307 | 10/1995 |
| JP | 8-329516 | 12/1996 |
| JP | 9-106566 | 4/1997 |
| JP | 9-180237 | 7/1997 |
| JP | 9-212910 | 8/1997 |
| JP | 10-269613 | 10/1998 |
| JP | 11-86313 | 3/1999 |
| JP | 11-273119 | 10/1999 |

* cited by examiner

Primary Examiner—W. R. Young
(74) Attorney, Agent, or Firm—McGinn & Gibb, PLLC

(57) ABSTRACT

An optical head includes a light source for generating a luminous flux, a polarization beam splitter, an object lens opposed to an appropriate recording medium, and a power monitoring device for monitoring the power of the luminous flux output from the light source. The power monitoring device is adapted to utilize a peripheral portion of the luminous flux. This peripheral portion of the luminous flux is distinct from the portion of the luminous flux that is used for reproducing predetermined information from the recording medium and recording the predetermined information onto the recording medium.

13 Claims, 4 Drawing Sheets

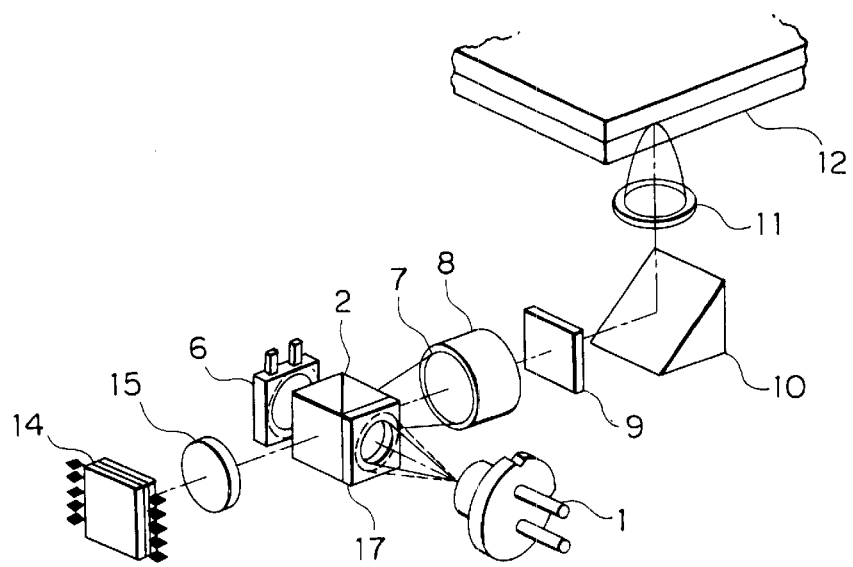
FIG. 3
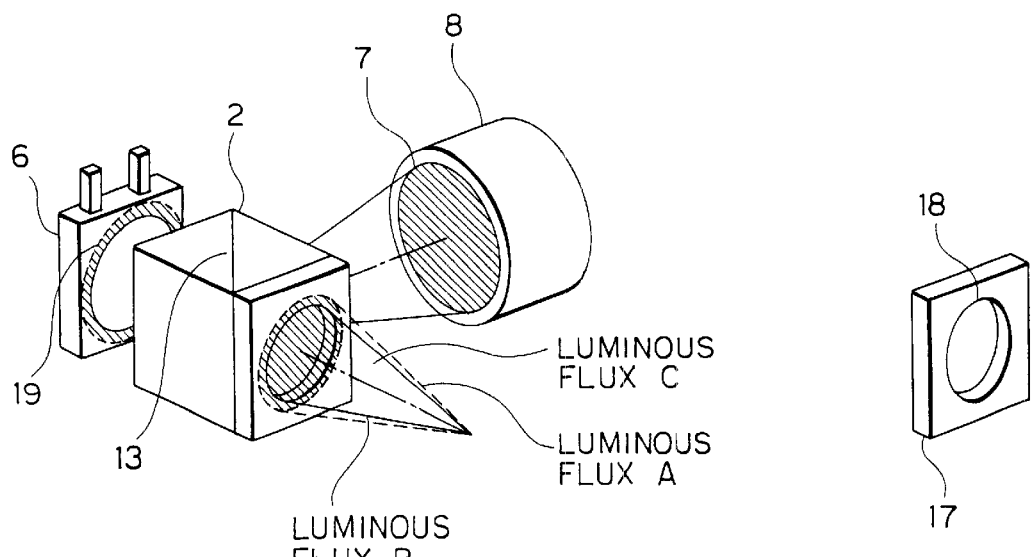
FIG. 4A
FIG. 4B

OPTICAL HEAD AND METHOD FOR MONITORING LIGHT SOURCE OUTPUT IN OPTICAL HEAD

BACKGROUND OF THE INVENTION

1. Field of the Invention

The present invention relates to an optical head and a method for monitoring a light source output in the optical head and, more particularly, to a smaller optical head capable of efficiently monitoring a light beam output such as a laser beam output supplied by a predetermined light source means.

2. Description of the Related Art

Hitherto, as shown in FIGS. 1 and 2, for example, an optical head has a structure wherein a light beam emitted from a semiconductor laser 1, which is an example of a light source means, passes through a polarization beam splitter 2 to be split into a light beam reflected toward a collimating lens 7 and a light beam transmitted toward a power monitoring means 6 at a certain ratio of light amount before they are provided for use.

Disposed in a matrix on the surface of the power monitoring means 6 are arbitrary photodetecting elements 16 divided and defined in an appropriate number. The light beams that are reflected by a reflection surface 13 of the polarization beam splitter 2 and used for recording or reproducing information are, for example, irradiated onto an appropriate recording medium 12 via the collimating lens 7 retained by an appropriate lens holder 8, a quarter wavelength plate 9, a riser mirror 10, and an object lens 11.

The light beam reflected back from the recording medium 12 passes through the reflection surface of the polarization beam splitter 2 and enters a predetermined signal detection sensor 14 via a condensing lens 15.

In the optical head having the structure described above, a luminous flux A representing the whole amount of light emitted from the semiconductor laser 1 is not directed toward the collimating lens 7. Instead, a part of the luminous flux A is transmitted through the polarization beam splitter 2 and supplied to the power monitoring means 6.

Hence, in a typical optical head, the receiving of light by the power monitoring means 6 for detecting the amount of light emitted from the semiconductor laser 1 deteriorates the utilization efficiency of light beams in the optical head.

In the optical head, the required power for applying semiconductor laser beams to the recording medium 12 is restricted, while the value of this power and the light beam utilization efficiency of the optical head determine the required emitting output of the semiconductor laser 1.

Hence, the lower the light beam utilization efficiency of an optical head is, the larger the optical output of the semiconductor laser 1 must be. This has been posing a problem of higher cost of components.

Further, increasing the output of a short wavelength semiconductor laser is limited, so that the required light output to the recording medium 12 cannot be obtained if the light beam utilization efficiency of the optical head is low. This has been presenting a problem in that the performance of an apparatus incorporating the optical head cannot be improved or a satisfactory apparatus cannot be implemented.

Japanese Unexamined Patent Publication (JP-A) No. 212910/1997 has disclosed an example wherein a light beam output from the same light source means is split into two light beams. The optical pickup described in the publication is configured so that one light beam of the split light beam is irradiated to a first recording medium having a first thickness, while the other light beam is irradiated to a second recording medium having a second thickness. The example discussed in the publication has not disclosed that the power levels of a part of the split light beam and a light beam emitted from the light source means are monitored.

SUMMARY OF THE INVENTION

Accordingly, an object of the present invention is to provide an optical head capable of improving light beam utilization efficiency by using a simple configuration.

Another object of the present invention is to provide a method for monitoring a light source output in an optical head. The method permits monitoring an output state of a light beam emitted from a light source means without deteriorating light utilization efficiency.

To this end, an optical head according to one aspect of the present invention includes a light source means for generating a light beam, a polarization beam splitter, an object lens opposed to a recording medium, and a power monitoring means for monitoring the power of the light beam emitted from the light source means. The power monitoring means is configured to monitor the power of the light beam emitted from the light source means by utilizing a portion of the light beam other than a portion thereof substantially used for reproducing or recording predetermined information from or onto the recording medium.

In a method for monitoring a light source output in an optical head according to another aspect of the present invention, the optical head has a light source means for generating a light beam, a polarization beam splitter, an object lens opposed to a recording medium, and a power monitoring means for monitoring the power of the light beam emitted from the light source means. The power monitoring means monitors the power of the light beam emitted from the light source means by making use of a portion of the light beam other than a portion thereof substantially used for reproducing or recording predetermined information from or onto the recording medium.

BRIEF DESCRIPTION OF THE DRAWINGS

FIG. 3 is a perspective view of an optical head according to a first embodiment of the present invention;

FIG. 4A is an enlarged perspective view of an essential section of the optical head according to the first embodiment of the present invention;

FIG. 4B is an enlarged perspective view showing a half-wave plate in the optical head of the first embodiment of the present invention;

DESCRIPTION OF THE PREFERRED EMBODIMENT

Figure 1:
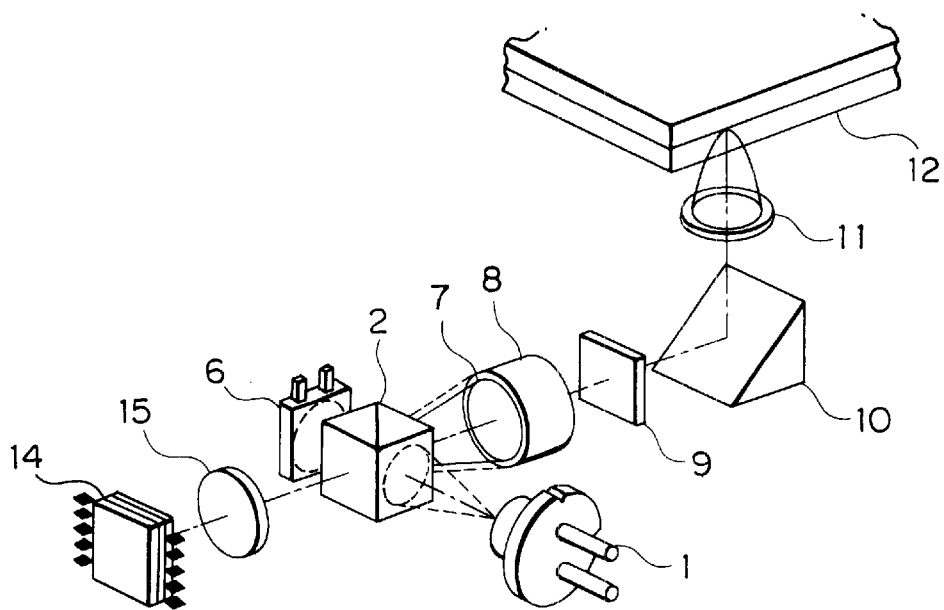
FIG. 1 is a perspective view of a conventional optical head.
Figure 2:
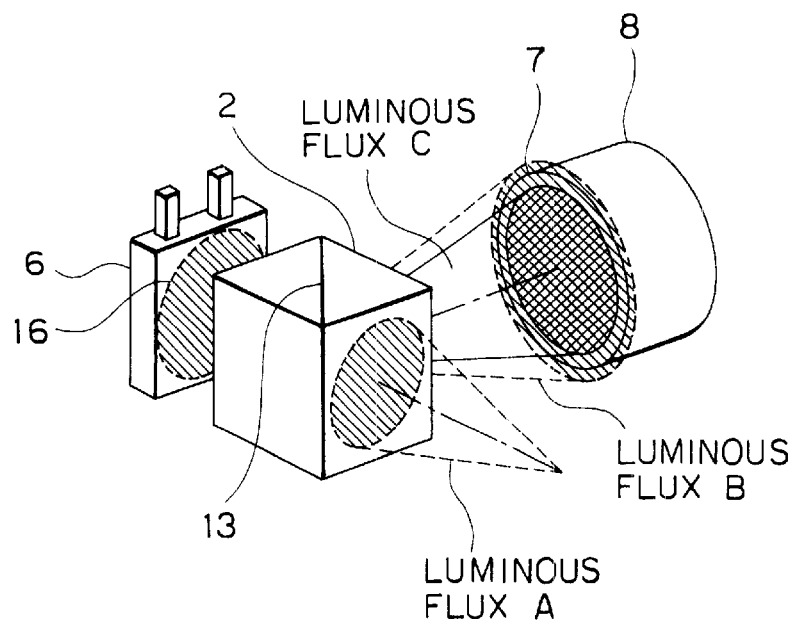
FIG. 2 is an enlarged perspective view of an essential section of the conventional optical head.

An optical head of the present invention that employs the configuration described above is able to improve light utilization efficiency by irradiating a portion of light beam, which used to be discarded wastefully, to a power monitoring means so as to detect the amount of light emitted from a light source means employing, for example, a semiconductor laser.

To be more specific, as illustrated in FIGS. 3, 4A, and 4B, a half-wave plate 17 having an aperture 18 is provided on the side of a semiconductor laser 1 of a polarization beam splitter 2. A light beam transmitted through the aperture 18 of the half-wave plate 17 is reflected by a reflection surface 13 of the polarization beam splitter 2, and enters a collimating lens 7 retained by a lens holder 8.

A light beam passing through a portion other than the aperture 18 of the half-wave plate 17 is turned 90 degrees in the direction of polarization, transmitted through the reflection surface 13 of the polarization beam splitter 2, and received by a power monitoring means 6. By setting the diameter of the aperture 18 of the half-wave plate 17 to a value obtained by the conversion based on the effective diameter of the collimating lens 7, only the amount of light, which is not used due to eclipse, among the light emitted from the semiconductor laser 1 is allowed to be received by the power monitoring means 6. This makes it possible to increase the percentage of light received by the power monitoring means 6 without causing a decrease in the percentage of light incident upon an object lens 11.

Referring now to the accompany drawings, the embodiments of an optical head and a method for monitoring the light source output in the optical head will be described in detail.

FIG. 3 is a block diagram showing the configuration of a first embodiment of the optical head of the present invention. The optical head shown in the figure is composed of a light source means 1 for generating a luminous flux A, a polarization beam splitter 2, an object lens 11 opposed to an appropriate recording medium 12, and a power monitoring means 6 for monitoring the power of the luminous flux A output from the light source means 1. The power monitoring means 6 utilizes a luminous flux B other than a luminous flux C of the luminous flux A (the whole amount of light) in order to monitor the power of the luminous flux A output from the light source means 1. The luminous flux C is substantially used for reproducing predetermined information from a recording medium 12 or recording predetermined information onto the recording medium 12.

Preferably, the light source means 1 of the present invention is, for example, a semiconductor laser. Further, it is desirable that the luminous flux B used for monitoring the power of the luminous flux A in the present invention is the luminous flux constituting the peripheral portion of the luminous flux A.

Further, in a more specific configuration according to the present invention, the power monitoring means 6 is preferably provided so that it is opposed to the light source means 1 via the polarization beam splitter 2.

In the foregoing embodiment, it is desirable to apply a half-wave plate 17 to the surface of the polarization beam splitter 2 that is opposed to the light source means 1. The half-wave plate 17 has an aperture 18 for allowing only the luminous flux, namely, the luminous flux C substantially used for reproducing or recording predetermined information, to pass therethrough.

In the embodiment of the present invention, the power monitoring means 6 has a photodetecting assembly 19 divided into an appropriate number of segments. The photodetecting assembly 19 receives the annular luminous flux B transmitted through the half-wave plate 17, and outputs information regarding the output power of the light source means 1 on the basis of the amount of the received annular luminous flux B.

A further detailed embodiment of the optical head shown in the foregoing embodiment of the present invention will be described below.

FIG. 3 shows an optical system of an optical head 20 of the first embodiment of the present invention. FIG. 4A is an enlarged view of a section that characterizes the present invention, and a neighborhood of the section; and FIG. 4B is an enlarged view of an optical element of the present invention.

Referring to FIG. 3, the half-wave plate 17 is sticked on the polarization beam splitter 2. A luminous flux emitted from the semiconductor laser 1 serving as the light source means enters the half-wave plate 17 having the aperture 18 as shown in FIG. 4B, then is split into a luminous flux that is reflected by a reflection surface 13 of the polarization beam splitter 2 and a luminous flux that is transmitted therethrough.

As illustrated in FIG. 4A, the luminous flux B transmitted through the polarization beam splitter 2 is received by the power monitoring means 6 and used for detecting the amount of light emitted from the semiconductor laser 1.

On the other hand, the luminous flux reflected at the polarization beam splitter 2 enters a collimating lens 7. A part of the luminous flux that has a diameter larger than the effective diameter of the collimating lens 7 develops an eclipse and therefore does not enter the collimating lens 7.

A majority of the luminous flux, however, enters the collimating lens 7 to turn into a collimated beam. The collimated beam is then transmitted through a quarter wavelength plate 9, reflected by a riser mirror 10, and focused onto a recording medium 12 through an object lens 11.

The light beam reflected by the recording medium 12 traces back the same optical path, namely, the riser mirror 10, the quarter wavelength plate 9, the collimating lens 7, and the polarization beam splitter 2 in that order. Thus the light beam is received by a signal detection sensor 14 that detects a signal therefrom.

Preferably, the diameter of the aperture 18 of the half-wave plate 17 is set such that it is larger than the diameter that causes an eclipse by the effective diameter of the collimating lens 7, whereas it is smaller than the diameter of the luminous flux A emitted from the semiconductor laser 1.

Thus, a part of the light beam emitted from the semiconductor laser 1 is transmitted through the vitreous constituent of the half-wave plate 17 and another part thereof is not transmitted therethrough.

The half-wave plate 17 is axially disposed so that the direction of polarization of an incident light beam is rotated 90 degrees.

The operation of the optical head of the present invention will now be described in detail.

Referring to FIGS. 3 and 4A, the luminous flux C of the luminous flux A emitted from the semiconductor laser 1 is transmitted through the aperture 18 of the half-wave plate 17, whereas it is not transmitted through the vitreous constituent of the half-wave plate 17. Nearly all the luminous flux C is reflected by the reflection surface 13 of the polarization beam splitter 2, enters the collimating lens 7, reaches the recording medium 12 via the quarter wavelength plate 9, the riser mirror 10, the object lens 11, and is used for reading or writing information.

The luminous flux B having a larger diameter than the aperture 18 of the half-wave plate 17 (the luminous flux B is the portion that remains after eliminating the luminous flux C from the luminous flux A) is rotated 90 degrees in the direction of polarization as it passes through the vitreous constituent of the half-wave plate 17. Nearly all the luminous flux B is transmitted through the reflection surface 13 of the polarization beam splitter 2 and received by the power monitoring means 6. The received luminous flux is used to detect the power output from the semiconductor laser 1.

The diameter of the luminous flux B is determined by the diameter of the aperture 18 of the half-wave plate 17. Since the diameter of the aperture 18 is set to be larger than the diameter calculated based on the effective diameter of the collimating lens 7, the half-wave plate 17 does not influence the optical characteristics or the utilization efficiency of light beams from the collimating lens 7 and after.

In other words, of the luminous flux A, a luminous flux other than the luminous flux B has a larger diameter than the effective diameter of the collimating lens 7, so that it incurs the eclipse because of the collimating lens 7, and is not used for reading from or writing into the recording medium 11. Hence, only the light beams not used are received by the power monitoring means 6.

Figure 5:
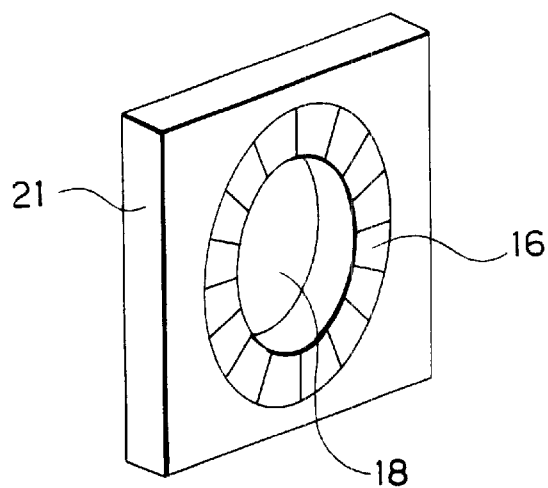
FIG. 5 is an enlarged perspective view of a shielding plate applied to a power monitoring means in an optical head of a second embodiment of the present invention.

A second embodiment of the power monitoring means 6 of the present invention may be, for example, the one shown in FIG. 5. In the second embodiment, a shielding plate 21 having the aperture 18 is applied to the surface of the polarization beam splitter 2, the surface being opposed to the light source means 1. The aperture 18 allows only the luminous flux C to pass therethrough, the luminous flux C being substantially used for reproducing or recording predetermined information. Also, a plurality of photodetecting elements 16 are disposed along the periphery of the aperture 18 of the shielding plate 21.

Figure 6:
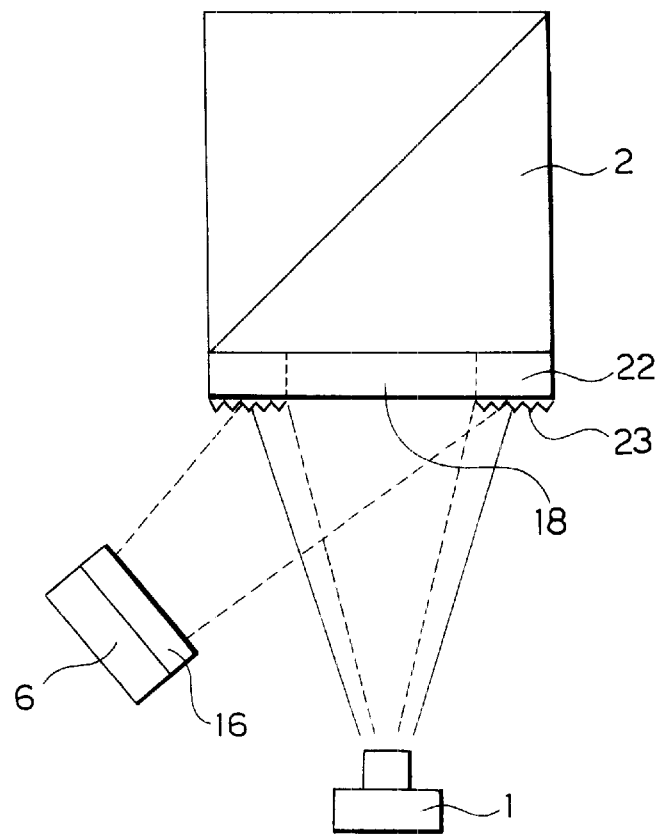
FIG. 6 is a top plan view of a power monitoring means in an optical head of a third embodiment of the present invention.

A third embodiment of the power monitoring means 6 may be configured, for example, as shown in FIG. 6. In the third embodiment, a shielding plate 22 having the aperture 18 is applied to the surface of the polarization beam splitter 2, the surface being opposed to the light source means 1. The aperture 18 allows only the luminous flux C to pass therethrough, the luminous flux C being substantially used for reproducing or recording predetermined information. Also, a hologram 23, which reflects the luminous flux B of the luminous flux A in a particular direction, is provided along the periphery of the aperture 18 of the shielding plate 22, and the power monitoring means 6 is provided in a position toward which the luminous flux is reflected by the hologram 23.

Figure 7:
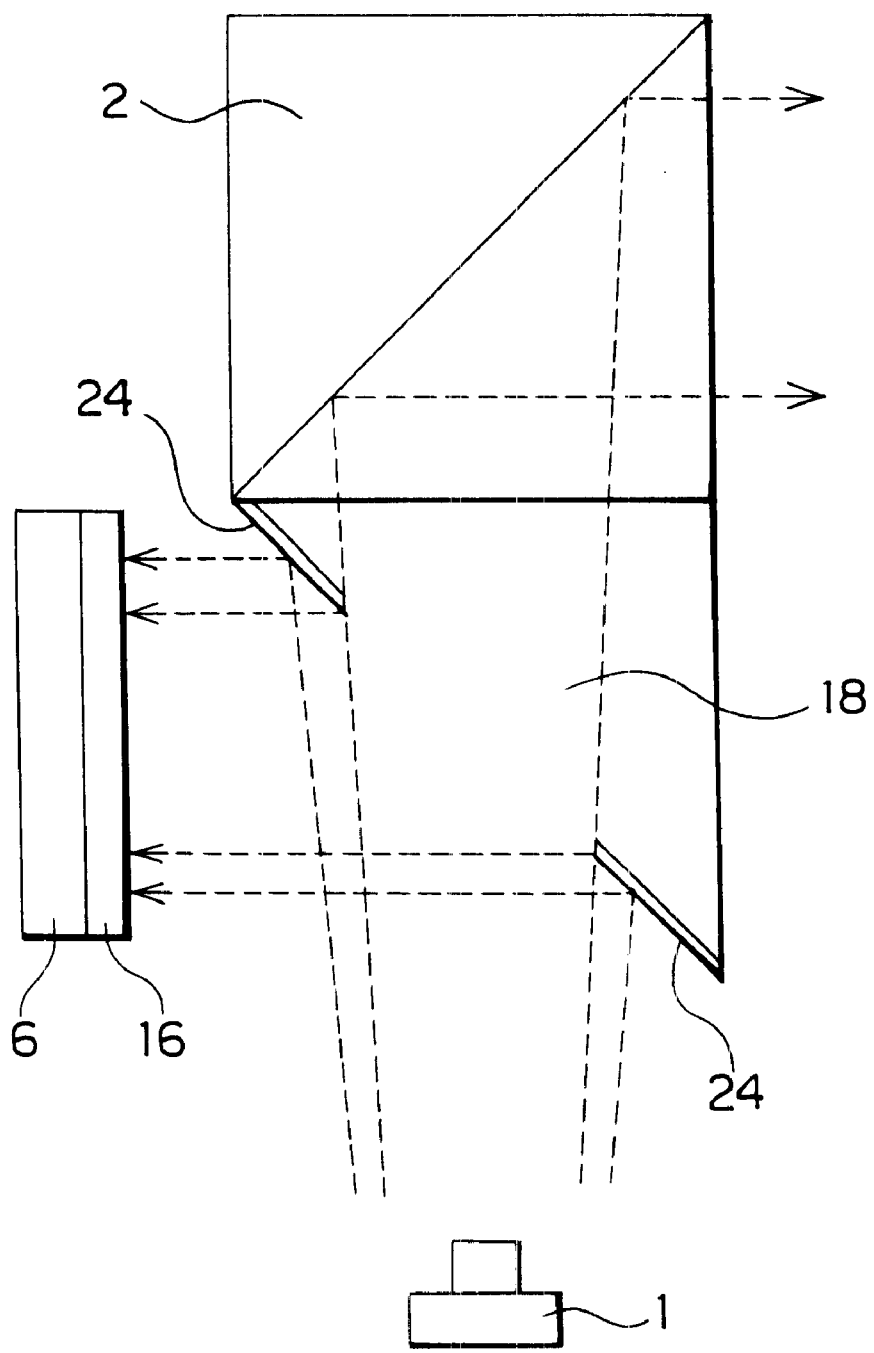
FIG. 7 is a top plan view of a power monitoring means in an optical head of a fourth embodiment of the present invention.

A fourth embodiment of the power monitoring means 6 may be configured, for example, as shown in FIG. 7. In the fourth embodiment, a reflector 24 having the aperture 18 is abutted against the surface of the polarization beam splitter 2 at a predetermined angle with respect to the surface of the polarization beam splitter 2, the surface being opposed to the light source means 1. In this case, the aperture 18 allows only the luminous flux C to pass therethrough, the luminous flux C being substantially used for reproducing or recording predetermined information. Further, the power monitoring means 6 may be provided in a position toward which the luminous fluxes are reflected by the reflector 24.

As it is obvious from the above description, according to the method for monitoring the output of a light source in an optical head of the present invention, in the optical head that includes a light source means for generating a light beam, a polarization beam splitter, an object lens opposed to an appropriate recording medium, and a power monitoring means for monitoring the power of the light beam emitted from the light source means, the power monitoring means monitors the power of the light beam output from the light source means by utilizing a portion of the light beam other than a portion thereof substantially used for reproducing or recording predetermined information from or onto the recording medium.

In the method for monitoring the output of the light source in the optical head, it is desirable that the light source means is a semiconductor laser, and the light beam portion of the light beam, which is used for monitoring the power of the light beam, is the one constituting the peripheral portion of the light beam.

The optical head and the method for monitoring the output of a light source in the optical head designed as described above permit improved utilization efficiency of the light of the optical head. This makes it possible to reduce the output of a semiconductor laser for attaining an optical output required for a recording medium, and also to achieve reduced cost of components.

Moreover, the limitation in increasing the output of a short wavelength semiconductor laser can be overcome by the improved light utilization efficiency of the optical head, thus achieving increased power of the light irradiated to a recording medium. This enables improved performance of a system incorporating the optical head.

The advantages obtained by the present invention are primarily based on successful utilization of the light beams that have conventionally been not used. The successful utilization of the light beams has been accomplished by separating the light beams that are not used due to the eclipse taking place because of the effective diameter of an optical element such as a collimating lens from the light beams primarily used in an optical system by means of a half-wave plate having an aperture and a polarization beam splitter.

What is claimed is:

1. An optical head comprising:
   a light source device for generating a light beam;
   a polarization beam splitter;
   an object lens opposed to a recording medium; and
   a power monitoring device for monitoring the power of said light beam emitted from said light source device;
   wherein a half wave plate having an aperture is applied to a surface of said polarization beam splitter, said surface being opposed to said light source device.

2. An optical head as claimed in claim 1, wherein said light source device comprises a semiconductor laser.

3. An optical head as claimed in claim 1, wherein said light source device comprises a light beam portion including a peripheral portion of said light beam.

4. An optical head as claimed in claim 1, wherein said power monitoring device is provided such that it is opposed to said light source via said polarization beam splitter.

5. An optical head as claimed in claim 4, wherein:
   said power monitoring device has a photodetecting assembly divided into segments; and
   said photodetecting assembly receives an annular light beam transmitted through said half-wave plate and outputs information regarding the output power of said light source device on the basis of the amount of the received annular light beam.

6. An apparatus for monitoring a light source output comprising:
   an optical head which includes a light source device for generating a light beam, a polarization beam splitter, an object lens opposed to a recording medium, and a power monitoring device for monitoring the power of said light beam emitted from said light source device; and a half-wave plate having an aperture applied to a surface of said polarization beam splitter, said surface being opposed to said light source device.

7. The apparatus of claim 6, wherein said light source comprises a semiconductor laser.

8. The apparatus of claim 6, wherein a portion of said light beam is used for monitoring said power of said light beam, wherein said portion comprises a peripheral portion of said light beam.

9. An optical head comprising:

a light source;

a polarization beam splitter for receiving a light from said light source;

an object lens for receiving a light from said beam splitter;

a power monitoring device monitoring a portion of a light beam not used for recording/reproducing on a recorded medium; and a half-wave plate having an aperture and applied to a surface of the polarization beam splitter opposed to the light source which allows only the light beam portion used for recording/reproducing to pass.

10. The optical head of claim 9, wherein the power monitoring device is opposed to the light source.

11. An optical head comprising:

a light source;

a polarization beam splitter for receiving a light from said light source;

an object lens for receiving a light from said beam splitter;

a power monitoring device monitoring a portion of a light beam which is not used for recording/reproducing on a recorded medium; and a shielding plate having an aperture, which allows only said light beam portion substantially used for reproducing or recording predetermined information to be transmitted therethrough, wherein said shielding plate is applied to a surface of said polarization beam splitter, and wherein said surface is opposed to said light source.

12. The optical head of claim 11, wherein the power monitoring device is opposed to the light source.

13. The optical head of claim 11, further comprising a plurality of photodetecting elements disposed along the periphery of said aperture of said shielding plate.

* * * * *